US012056119B2

(12) United States Patent
Bundrage

(10) Patent No.: US 12,056,119 B2
(45) Date of Patent: Aug. 6, 2024

(54) METHODS AND SYSTEMS FOR STORE NAVIGATION

(71) Applicant: Lisa Bundrage, Lithia Springs, GA (US)

(72) Inventor: Lisa Bundrage, Lithia Springs, GA (US)

( * ) Notice: Subject to any disclaimer, the term of this patent is extended or adjusted under 35 U.S.C. 154(b) by 164 days.

(21) Appl. No.: 15/621,832

(22) Filed: Jun. 13, 2017

(65) Prior Publication Data

US 2018/0357236 A1 Dec. 13, 2018

Related U.S. Application Data

(60) Provisional application No. 62/494,050, filed on Jul. 26, 2016.

(51) Int. Cl.
*G06F 16/245* (2019.01)
*G06Q 30/0601* (2023.01)
*H04L 67/52* (2022.01)

(52) U.S. Cl.
CPC ....... *G06F 16/245* (2019.01); *G06Q 30/0625* (2013.01); *G06Q 30/0639* (2013.01); *H04L 67/52* (2022.05)

(58) Field of Classification Search
CPC ............ G06Q 30/0639; G06Q 30/0625; G06F 16/245
See application file for complete search history.

(56) References Cited

U.S. PATENT DOCUMENTS

| | | | | |
|---|---|---|---|---|
| 6,604,681 B1* | 8/2003 | Burke | .................. | B62B 3/1424 235/379 |
| 7,406,437 B2* | 7/2008 | Goodwin, III | ......... | G06Q 30/02 342/357.75 |
| 7,707,073 B2* | 4/2010 | Bloebaum | ............... | H04W 4/80 705/26.8 |
| 8,150,740 B1* | 4/2012 | Miller | .................... | G06Q 30/00 705/26.1 |
| 9,129,276 B1* | 9/2015 | Fasoli | .................. | G06Q 20/203 |
| 9,424,598 B1* | 8/2016 | Kraft | ..................... | H04W 4/025 |
| 10,163,150 B1* | 12/2018 | Eby | ..................... | G06Q 30/0639 |
| 11,085,790 B2* | 8/2021 | Marusco | ............. | G06F 3/04815 |
| 11,105,635 B2* | 8/2021 | Varoglu | ................ | G01C 21/206 |
| 11,238,522 B1* | 2/2022 | Subramanian | ..... | G06Q 30/0639 |
| 2001/0034660 A1* | 10/2001 | Heumann | .............. | G06Q 30/02 705/26.9 |
| 2001/0047306 A1* | 11/2001 | Garretson | ............ | G06Q 10/087 705/20 |
| 2001/0049636 A1* | 12/2001 | Hudda | ............... | G06Q 30/0601 705/26.1 |
| 2002/0004753 A1* | 1/2002 | Perkowski | ............. | G06Q 30/02 705/26.62 |
| 2002/0049607 A1* | 4/2002 | Perkowski | ............. | G06Q 30/02 705/26.1 |

(Continued)

*Primary Examiner* — Brittany N Allen
(74) *Attorney, Agent, or Firm* — Ballard Spahr LLP

(57) ABSTRACT

Disclosed are methods and apparatuses for store navigation. A query comprising at least one search term is received from a user device. The query is applied to at least one inventory to determine at least one product responsive to the query. Product location information identifying a location of the at least one product in a particular store is determined. The product location information is transmitted to a user device.

14 Claims, 4 Drawing Sheets

(56) References Cited

U.S. PATENT DOCUMENTS

| | | | |
|---|---|---|---|
| 2002/0082945 A1* | 6/2002 | Tenorio | G06Q 30/06 705/26.1 |
| 2002/0087505 A1* | 7/2002 | Smith | G06Q 10/087 |
| 2003/0065805 A1* | 4/2003 | Barnes, Jr. | G06Q 10/02 709/231 |
| 2003/0158796 A1* | 8/2003 | Balent | G06Q 30/0633 705/28 |
| 2003/0177072 A1* | 9/2003 | Bared | G06Q 30/06 705/26.81 |
| 2012/0191817 A1* | 7/2012 | Sayan | G06Q 30/0639 709/219 |
| 2012/0259732 A1* | 10/2012 | Sasankan | H04W 4/021 705/26.9 |
| 2013/0218721 A1* | 8/2013 | Borhan | G06Q 20/322 705/26.41 |
| 2014/0207619 A1* | 7/2014 | Ishebabi | G06Q 30/0623 705/26.61 |
| 2014/0324627 A1* | 10/2014 | Haver | G06Q 30/0639 705/26.9 |
| 2015/0012426 A1* | 1/2015 | Purves | G06Q 30/0623 705/41 |
| 2015/0161715 A1* | 6/2015 | Rose | G06Q 30/0639 705/26.8 |
| 2015/0262120 A1* | 9/2015 | Kulig | G06Q 10/087 705/28 |
| 2015/0294396 A1* | 10/2015 | Goodwin | G06Q 30/0639 705/26.9 |
| 2016/0041000 A1* | 2/2016 | Nallu | G06Q 30/0639 701/418 |
| 2016/0125505 A1* | 5/2016 | Goulart | G06Q 30/0639 705/26.8 |
| 2016/0223339 A1* | 8/2016 | Pellow | G06Q 30/0625 |
| 2017/0131113 A1* | 5/2017 | Nallu | G06Q 30/0633 |
| 2017/0221119 A1* | 8/2017 | Pellow | G06Q 30/0625 |
| 2019/0005569 A1* | 1/2019 | Kotha | G06Q 30/0639 |
| 2019/0236686 A1* | 8/2019 | Thompson | G06Q 30/0643 |

* cited by examiner

METHODS AND SYSTEMS FOR STORE NAVIGATION

CROSS REFERENCE TO RELATED PATENT APPLICATION

This application claims priority to U.S. Provisional Application No. 62/494,050 filed Jul. 26, 2016, herein incorporated by reference in its entirety.

BACKGROUND

Retail locations make an inventory of products available for purchase. For retail locations stocking a large inventory of a variety of products, a consumer may experience difficulty locating a particular product for purchase. Though these retail locations may employ staff tasked with assisting costumers in finding their desired products, these staff members may be difficult to locate, or may be otherwise occupied with another customer. Moreover, relying on staff members for assistants leaves open opportunities for human error, further complicating the retail purchase process. These and other shortcoming are addressed by the methods and systems set forth herein.

SUMMARY

It is to be understood that both the following general description and the following detailed description are exemplary and explanatory only and are not restrictive. Provided are methods and systems for store navigation. In an aspect, a method comprises receiving, by at least one computing device, from a user device, a query comprising at least one search term; applying, by the at least one computing device, the query to at least one inventory to determine at least one product responsive to the query; determine, by the at least one computing device, for the at least one product, product location information identifying a location of the at least one product in a particular store; and transmitting, by the at least one computing device, the product location information to a user device.

In an aspect, an apparatus comprises one or more processors; and a memory comprising processor executable instructions that, when executed by the one or more processors, cause the apparatus to: receive, from a user device, a query comprising at least one search term; apply the query to at least one inventory to determine at least one product responsive to the query; determine, for the at least one product, product location information identifying a location of the at least one product in a particular store; and transmit the product location information to a user device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
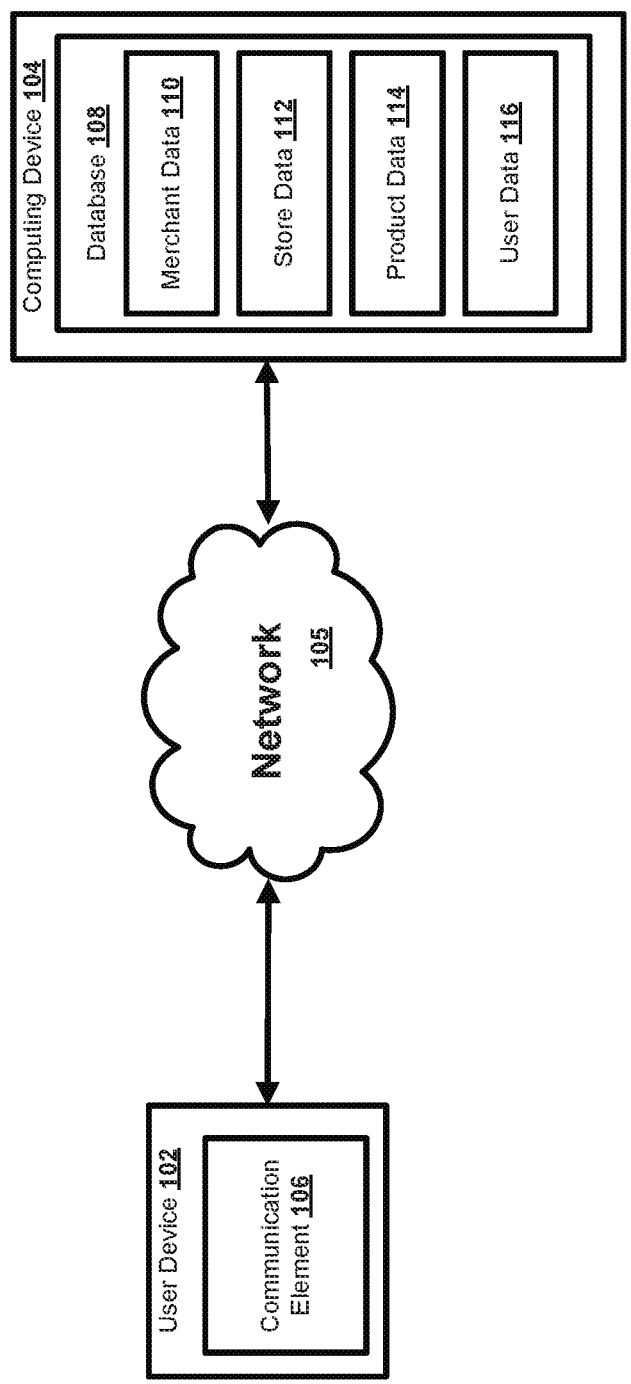
FIG. 1 is an example network diagram.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future.

In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to methods and systems for store navigation. Locating a product for purchase in a brick-and-mortar retail location ("store") can be difficult, leading to an unsatisfactory customer experience. For example, locating a product for purchase can be difficult due to a size of an inventory, an arrangement or organization of products for purchase in the store, or a store floor plan. Although staff members may be employed by a given store to assist customers in finding products, the store may be understaffed, or the staff member may be prone to errors, inadequately trained, or inadequately informed. This can lead to an overall unsatisfactory shopping experience due to an inability to find a product for purchase, or a prolonged shopping experience.

An application can be executed on a user device, such as a mobile device. The application can accept as an input a query for a product. The query can include a search terms to search for a product to be purchased, a specific product identifier such as a stock keeping unit (SKU), or another query. The application can then query one or more store inventories to locate the product. A user interface can be presented to assist in locating the product. The user interface can include location information facilitating the location of a product within a store. Such location information can include an isle, section, or shelf identification. The location information can also include a map or other representation of a store particularly identifying the product to be purchased. Thus, a customer can easily find products for purchase within a store with reduced or eliminated employee assistance.

In one aspect of the disclosure, a system can be configured to provide services such as network-related services to a user device. FIG. 1 illustrates various aspects of an exemplary environment in which the present methods and systems can operate. The present disclosure is relevant to systems and methods for providing services to a device, for example, a user device such as a computer, tablet, mobile device, communications terminal, or the like. In an aspect, one or more network devices can be configured to provide various services to one or more devices, such as devices located at or near a premises. In another aspect, the network devices can be configured to recognize an authoritative device for the premises and/or a particular service or services available at the premises. As an example, an authoritative device can be configured to govern or enable connectivity to a network such as the Internet or other remote resources, provide address and/or configuration services like DHCP, and/or provide naming or service discovery services for a premises, or a combination thereof. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet or a local area network. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface such as a web browser (e.g., Internet Explorer®, Mozilla Firefox®, Google Chrome®, Safari®, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the computing device 104 can be a server for communicating with the user device 102. As an example, the computing device 104 can communicate with the user device 102 for providing data and/or services. As an example, the computing device 104 can provide services such as network (e.g., Internet) connectivity, network printing, media management (e.g., media server), content services, streaming services, broadband services, or other network-related services. In an aspect, the computing device 104 can allow the user device 102 to interact with remote resources such as data, devices, and files. As an example, the computing device can be configured as (or disposed at) a central location (e.g., a headend, or processing facility), which can receive content (e.g., data, input programming) from multiple sources. The computing device 104 can combine the content from the multiple sources and can distribute the content to user (e.g., subscriber) locations via a distribution system.

In an aspect, the computing device 104 can manage the communication between the user device 102 and a database 108 for sending and receiving data therebetween. As an example, the database 108 can store a plurality of files (e.g., web pages), user identifiers or records, or other information.

As a further example, the user device 102 can request and/or retrieve a file from the database 108. The database can include merchant data 110. Merchant data 110 can include data corresponding to a particular merchant. A merchant can include a corporate entity or other retailer operating one or more stores. Merchant data 110 can include, for example, authentication credentials facilitating access to one or more inventories operated by the merchants 110. For example, a merchant can implement a third-party database or other service remotely located from the computing device 104. The computing device 104 can then access the third-party database using authentication credentials stored in the merchant data 110. For example, the merchant can expose an application program interface (API) for accessing their third-party database. The merchant data 110 can then include authentication credentials (e.g., usernames, passwords, tokens, and/or cryptographic keys) to access the API.

The database 108 can also include store data 112 describing one or more attributes of a store corresponding to a given merchant. For example, in an aspect, the database 108 can include a relational database with a given merchant data 110 entry associated with to one or more store data 112 entries. Store data 112 can include, for example, address information, global positioning system (GPS) location data, operating hours, or other data. Store data 112 can also include a two-dimensional or three-dimensional map or representation of the corresponding store. The database 108 can also include product data 114 describing one or more attributes of a particular product. In an aspect, the product data 114 can include a unique product identifier, including a SKU or universal product code (UPC). In an aspect, the product data 114 can include a price, product name, product description, search metadata, or other attributes. In an aspect, each store data 112 entry can correspond to one or more product data 114, with each product data 114 entry reflecting an product available for purchase at a respective store. In such an aspect, the product data 114 can include store-specific attributes such as an amount of a product in stock, as well as a location of the product in a given store. The location of the product can be expressed by an isle, section, shelf, row, or other area within a particular store. The location of the product can also include coordinates relative to a particular store to allow location of the product on a map of the store. The coordinates can be expressed two-dimensionally or three-dimensionally.

The database 108 can also include user data 116. The user data 116 can correspond to a user of the user device 102. The user data 116 can include, for example, usernames, passwords, or other authentication credentials for a user account. The user data 116 can also include user preferences relating to searching for products. Such preferences can include, for example, one or more preferred stores for inventory search, one or more preferred merchants for inventory search, minimum or maximum price thresholds for product search, or minimum or maximum distance thresholds for store inventory search. For example, the minimum or maximum distance thresholds can be defined relative to a location of the user device 102 as determined by a global positioning system (GPS) radio, network telemetry, or other location-identifying service. The minimum or maximum distance thresholds can also be defined relative to an address or other location indicated in the user data 116. Any information can be stored in and retrieved from the database 108. The database 108 can be disposed remotely from the computing device 104 and accessed via direct or indirect connection. The database 108 can be integrated with the computing system 104 or some other device or system.

In an aspect, the methods and systems described herein can be performed by the user device 102 and computing device 104. Although functionality set forth herein may be described as being performed by the user device 102, it is understood that such functionality can be performed in whole or in party by the computing device 104. Similarly, any functionality set forth as being performed by the computing device 104 can be performed in whole or in part by the user device 102.

For example, a user device 102 can transmit a query relating to a product to the computing device 104. In an aspect, the query can be transmitted by the communication element 106 (e.g. an application) as executed in the user device 102. In an aspect the query can include one or more text (numeric or alphanumeric) strings. In an aspect, the query can include a voice input. The query can then be applied to one or more inventories to identify a product. In an aspect, applying the query can include applying the query to one or more product data 114 entries stored in the database 108 of the computing device. In another aspect, applying the query can include including the query in an API call or other service call to a service operated by a particular merchant or store.

In an aspect, applying the query can include applying one or more constraints or filters limiting the scope of the search. For example, the constraints can include a distance threshold of store inventories to be searched. The distance threshold can be defined relative to a location of the user device 102 or a location indicated in user data 116. Thus, only store inventories included in the distance threshold (e.g. product data 114 associated with store data 112 identified as being included in the distance threshold) would be searched. The constraints can also include a selection of one or more merchants or one or more stores. Thus, only product data 114 associated with merchant data 110 of selected merchants, or product data 114 associated with store data 112 of selected stores, would be searched.

In an aspect, the computing device 104 can provide one or more responses to the query to the user device 102. In an aspect, the one or more responses can include a solicitation for a selection to further refine the search. For example, the one or more responses can include one or more stores whose store data 112 entries are associated with product data 114 entries match the submitted query. In such an example, this response can include a solicitation to select a store. A selection of the store can then be transmitted by the user device 102 to the computing device 104 to narrow the scope of the originally submitted query to the selected store. In another aspect, the responses can include a plurality of products whose product data 114 entries match the submitted query. For example, a search for "children's shampoo" could generate a response including several brands or SKUs of children's shampoo. The response would then solicit a selection of one of the products. The selection of the product would then be provided to the computing device 104 by the user device 102. Thus, the query can then be modified or narrowed to include the SKU, UPC, or other unique identifier of the selected product. Although the discussions above are presented with respect to identifying a single product for a single store, it is understood that multiple products can be identified for a given store, e.g. a "shopping list" of products. For example, multiple queries 314 may be submitted in order to search for multiple products.

In an aspect, the process of providing responses by the computing device 104 to narrow the scope of the query can be repeatedly performed. As an example, a given query can be received by the computing device 104. The computing device 104 may first provide a response soliciting the selection of one or more stores. In response to the selection of a store, the computing device may then provide a response soliciting the selection of one or more products. The computing device 104 may then provide a response for the selected product for the selected store. In an aspect, to facilitate the selection of multiple products from a store, a single store can be selected for narrowing the scope of a query. The user device 102 can then submit subsequent queries for products with the scope already limited to the selected store. Each of the subsequent queries can then be refined to a single product, thus allowing for the selection of multiple products for search from a single store. It is understood that additional responses for narrowing the scope of the query may be performed, and that the order of responses presented in the examples above are non-limiting.

In an aspect, once the search results have been refined to a one or more products for a single store, the user device 102 can present a user interface facilitating location of the product(s) in the given store, or a "store-level" user interface. In an aspect, the user interface can include one or more locations of the one or more products in the store according to the product data 114 entries of the products. The locations of the products can be expressed according to a shelf, isle, row, section, or other location within the store. In an aspect, the user interface can include a two- or three-dimensional map of the store. In an aspect, the locations of the products can be expressed as points or markers within the map. In aspects in which the user interface facilitates the location of multiple product, the user interface can include a selection mechanism of a product from the multiple products. In such an aspect, the location of one or more selected products can be presented at a time.

In another aspect, the user interface can include navigation directions (e.g. driving, walking, and/or transit directions) to the store. In an aspect, the user interface can transition to the "store level" user interface described above in response to determining that the user device 102 is within a predefined distance of the store, within a geofence relative to the store, or in response to a user input to the user interface.

Figure 2:
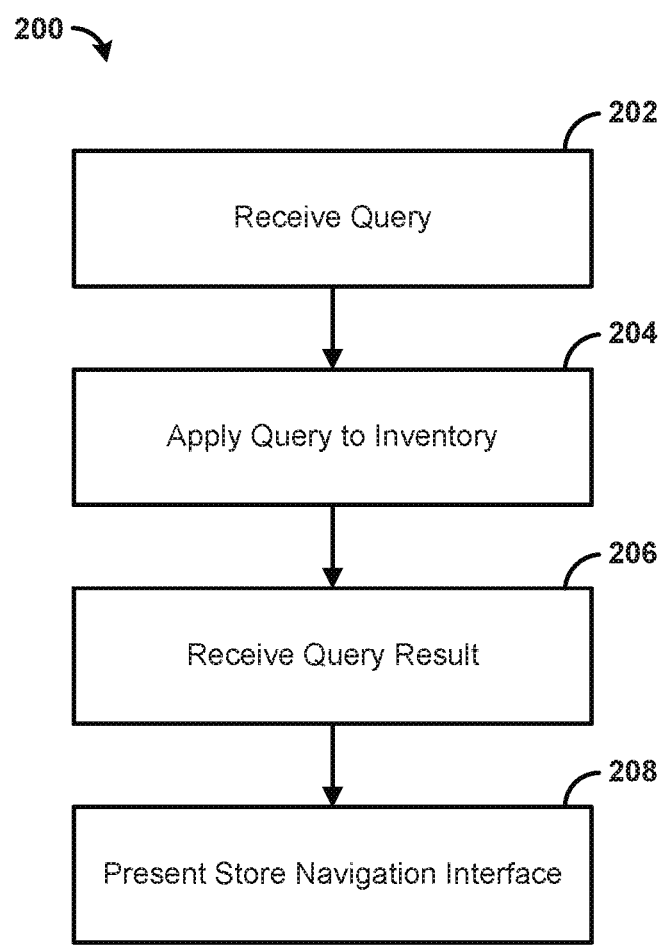
FIG. 2 is a flowchart of an example method.

FIG. 2 is a flowchart 200 of an example method. In an aspect, the method of the flowchart 200 relates to a query for locating a product for purchase in a particular store. In an aspect, the particular store can correspond to a user-selected or predefined store. For example, the particular store can correspond to a store selected via a selection to a user interface of a user device 102. In another aspect, the particular store can be indicated in user data 116 as a "favorite," "preferred," "last searched," or "last used" store, where the user data 116 corresponds to a user device 102.

Beginning with step 202, in an aspect, a query can be received (e.g., from a user device 102 by a computing device 104). For example, a communication element 106 of the user device 102 can accept the query as input for transmission to a computing device 104. In an aspect, the query can include one or more search terms. In an aspect, the one or more search terms can include a text input, a speech-to-text input, and/or a voice input to the communication element 106.

Next, in step 204, the query can be applied to an inventory. In an aspect, this can include determining store data 112 corresponding to the particular store, and then selecting product data 114 associated with the determined store data 112 responsive to the query. In an aspect, product data 114 can be deemed responsive to the query in response to one or more attributes of the product data 114 matching the search term(s) of the query, e.g. a matching SKU or UPC code. In another aspect, product data 114 can be deemed response to the query in response to a degree of similarity between the search term(s) and one or more attributes having a degree of similarity meeting a threshold, e.g. a title or description "similar" to the search terms.

In an aspect, the query can be applied to product data 114 of a database 108 accessible to or maintained by the computing device 104. In an aspect, the query can be applied to a database 108 made accessible by an exposed application program interface (API) or other service. For example, a merchant can maintain an accessible database 108 via an API. The computing device 104 can access the API using tokens or authentication credentials, e.g. token or authentication credentials stored in merchant data 110 associated with the particular store. In such an aspect, an API call can include the query and/or an identifier of the particular store. Thus, a single store for a merchant associated with multiple stores can be searched.

In step 206 a store navigation interface can be presented. In an aspect, presenting the store navigation interface can include transmitting, by the computing device 104, to the user device 102 at least a portion of product data 114 responsive to the query. For example, product location information included in the product data 114 can be transmitted to the user device 102. Product location information can include an isle, row, shelf, or section of the particular store where the product is stored or displayed. In an aspect, product location information can include two- or three-dimensional coordinates identifying the product in a map of the particular store. For example, the map can be accessed from store data 112 of the particular store. The map can then be modified to include one or more identifiers corresponding to the coordinates indicated in the product data 114. In an aspect, the identifiers can be encoded as overlays for the map. The modified map can then be transmitted to the user device 102. The user device 102 can then present a user interface displaying the transmitted product data 114 (e.g. the location information and/or the map).

Figure 3:
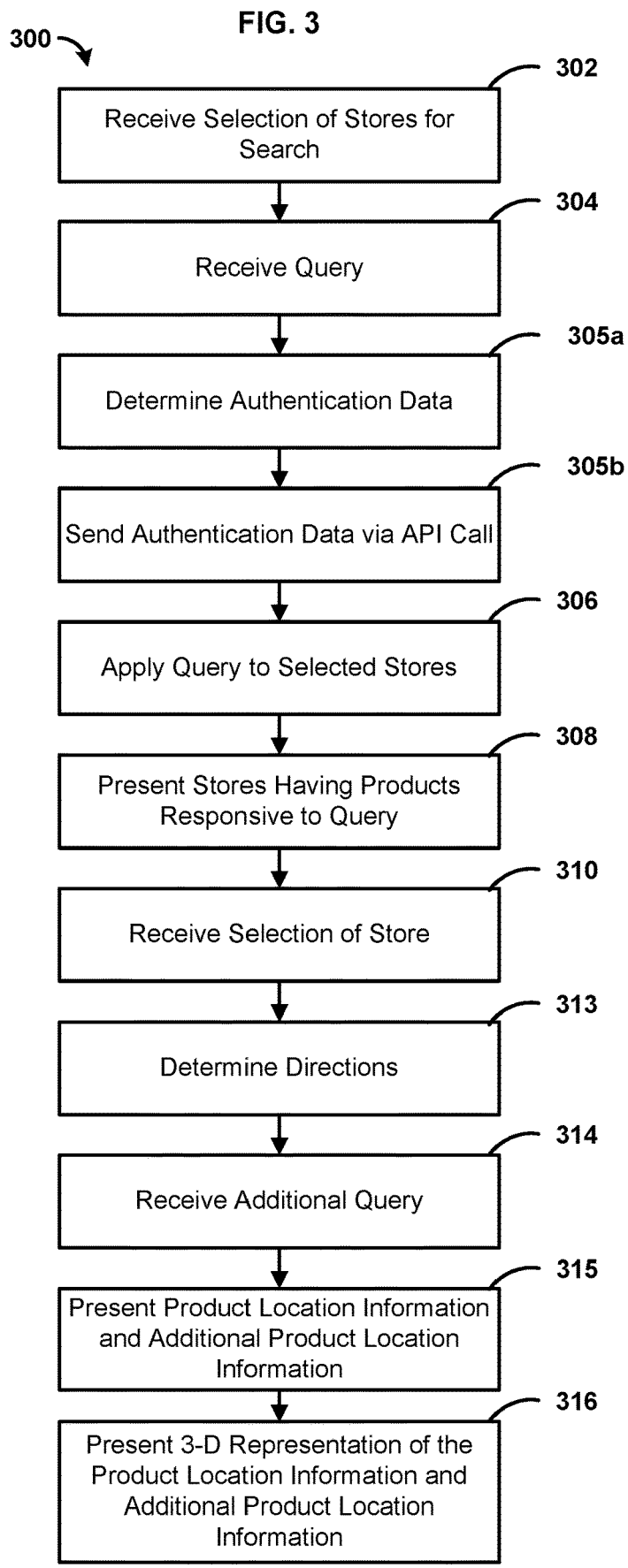
FIG. 3 is a flowchart of an example method.

FIG. 3 is a flowchart 300 of an example method. Beginning with step 302, a selection of stores for search can be received. For example, a computing device 104 can receive a selection of stores. In an aspect, the selection of stores can include one or more stores selected according to user input to a user device 102, with the user device 102 transmitting the selection of stores to the computing device 104. In an aspect, the selection of stores can be performed on a per-store basis. In another aspect, the selection of stores can be performed on a per-merchant basis, thereby selecting one or more stores associated with the merchant. In an aspect, the selection of stores can include one or more stores selected by the user device 102 and/or the computing device 104 according to one or more rules. For example, the one or more stores can include one or more stores indicated in user data 116 as a preferred, favorite, frequently used, or last used store. As another example, the user device 102 and/or the computing device 104 can select one or more stores located within a distance threshold. The user device 102 and/or the computing device 104 can also select one or more stores having an estimated travel time (e.g. drive time, transit time, walking time) below a time threshold.

Next, in step 304, a query can be received. For example, the computing device 104 can receive a query from the user device 102. In an aspect, the query can comprise one or more search terms. In an aspect, the search terms can correspond to a text input to the user device 102. In another aspect, the search terms can correspond to a voice or speech-to-text input to the user device 102. In an aspect, the search terms can include a string (numeric or alphanumeric) to be applied to one or more attributes of product data 114. In an aspect, the search terms can include a SKU or UPC for matching to one or more product data 114 entries.

In step 306 the received query is applied to the selected stores. For example, the computing device 104 and/or the user device 102 can apply the query. In an aspect, applying the query to the selected stores can include selecting store data 112 corresponding to each of the selected stores, and selecting, from product data 114 associated with the selected store data 112, product data 114 responsive to the query. In another aspect, applying the query to the selected stores can include accessing databases or inventories for the selected stores accessible by an API call or service call. Thus, product data 114 can be selected from third-party databases by performing the API call or service call with the query as a parameter. For example, a particular merchant can expose an API allowing for query of its associated store inventories. In an aspect, the computing device 104 can access merchant data 110 for the given merchant for authentication credentials 305a or the necessary API calls, and then perform the API call 305b with the query as a parameter. In such an aspect, one or more of the selected stores can be provided as a parameter to the API call, thereby defining the scope of which stores of a given merchant will have their inventories searched. In an aspect, the API call or service call can return product data 114 responsive to the query.

In an aspect, product data 114 can be responsive to the query when one or more attributes of the product data 114 match one or more search terms of the query. For example, product data 114 having a SKU or UPC attribute matching a text string search term would be responsive to the query. As another example, product data 114 can be responsive to the query when one or more attributes of the product data 114 and one or more search terms have a degree of similarity above a threshold. In an aspect, product data 114 can be responsive to the query when a number of stocked units for the given product are greater than zero.

In step 308 those stores having product responsive to the query are presented. For example, an indication of one or more stores whose store data 112 is associated with product data 114 responsive to the query can be presented. Thus, those stores stocking a product searched for are presented, allowing for a selection of a store stocking the product to be received in step 310. After receiving a selection of a store in step 310, a navigation interface can be presented in step 312.

In an aspect, presenting the navigation interface can include presenting a "store-level" navigation interface indicating the location of the searched product in the selected store. In an aspect, presenting the "store-level" navigation interface can include transmitting, by the computing device 104, to the user device 102 at least a portion of product data 114 responsive to the query associated with the store data 112 of the selected store. For example, product location information 315 included in the product data 114 can be transmitted to the user device 102. Product location information 315 can include an isle, row, shelf, or section of the particular store where the product is stored or displayed. In an aspect, product location information 315 can include two- or three-dimensional coordinates 316 identifying the product in a map of the particular store. For example, the map can be accessed from store data 112 of the particular store. The map can then be modified to include one or more identifiers corresponding to the coordinates indicated in the product data 114. In an aspect, the identifiers can be encoded as overlays for the map. The modified map can then be transmitted to the user device 102. The user device 102 can then present a user interface displaying the transmitted product data 114 (e.g. the location information 315 and/or the map).

In another aspect, presenting the navigation interface can include presenting transit directions, driving directions, walking directions, or other directions 313 from a location of the user device 102 (or another location) to the selected store. In response to a user input to the user device 102, or in response to the user device 102 corning within a predefined distance or geofence relative to the selected store, the "store-level" navigation interface can then be presented as set forth above.

Figure 4:
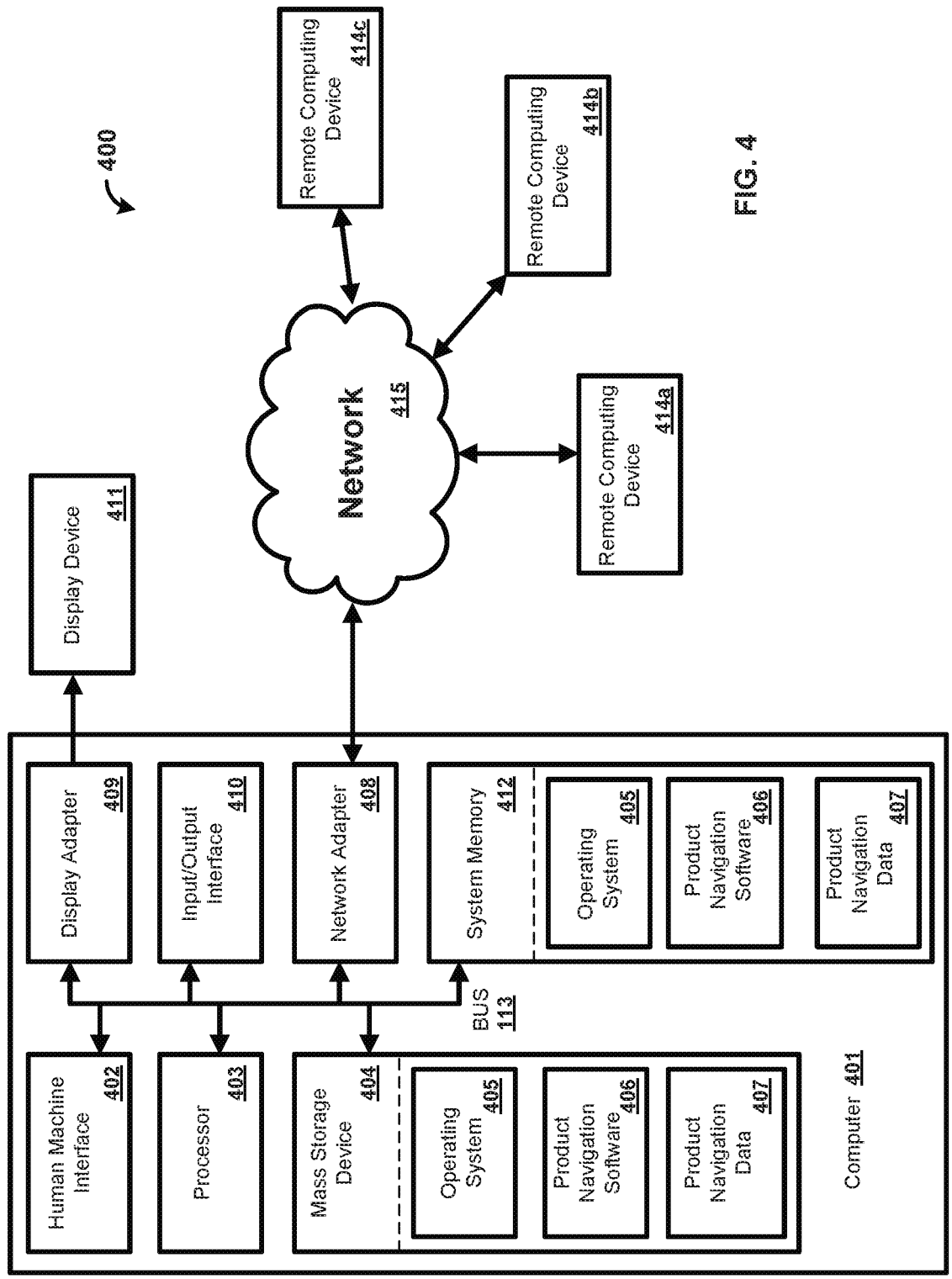
FIG. 4 is a block diagram of an example computing device.

In an exemplary aspect, the methods and systems can be implemented on a computer 401 as illustrated in FIG. 4 and described below. By way of example, the user device 102 or computing device 104 of FIG. 1 can be a computer as illustrated in FIG. 4, Similarly, the methods and systems disclosed can utilize one or more computers to perform one or more functions in one or more locations. FIG. 4 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data. structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 401. The components of the computer 401 can comprise, but are not limited to, one or more processors 403, a system memory 412, and a system bus 413 that couples various system components including the one or more processors 403 to the system memory 412. The system can utilize parallel computing.

The system bus 413 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card industry Association (PCMCIA), Universal Serial Bus (USB) and the like. The bus 413, and all buses specified in this description can also be implemented over a wired or wireless network connection and each of the subsystems, including the one or more processors 403, a mass storage device 404, an operating system 405, product navigation software 406, product navigation data 407 (e.g. merchant data 110, store data 112, product data 114 and/or user data 116), a network adapter 408, the system memory 412, an Input/Output Interface 410, a display adapter 409, a display device 411, and a human machine interface 402, can be contained within one or more remote computing devices 414a,b,c at physically separate locations, connected through buses of this form, in effect implementing a fully distributed system.

The computer 401 typically comprises a variety of computer readable media. Exemplary readable media can be any available media that is accessible by the computer 401 and comprises, for example and not meant to be limiting, both volatile and non-volatile media, removable and non-removable media. The system memory 412 comprises computer readable media in the form of volatile memory, such as random access memory (RAM), and/or non-volatile memory, such as read only memory (ROM). The system memory 412 typically contains data such as the product navigation data 407 and/or program modules such as the operating system 405 and the product navigation software 406 that are immediately accessible to and/or are presently operated on by the one or more processors 403, In another aspect, the computer 401 can also comprise other removable/non-removable, volatile/non-volatile computer storage media. By way of example, FIG. 4 illustrates the mass storage device 404 which can provide non-volatile storage of computer code, computer readable instructions, data structures, program modules, and other data for the computer 401. For example and not meant to be limiting, the mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, the operating system 405 and the product navigation software 406. Each of the operating system 405 and the product navigation software 406 (or some combination thereof) can comprise elements of the programming and the product navigation software 406. The product navigation data 407 can also be stored on the mass storage device 404. The product navigation data 407 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 401 via an input device (not shown). Examples of such input devices comprise, but are not limited to, a keyboard, pointing device (e. g., a "mouse"), a microphone, a joystick, a scanner, tactile input devices such as gloves, and other body coverings, and the like. These and other input devices can be connected to the one or more processors 403 via the human machine interface 402 that is coupled to the system bus 413, but can be connected by other interface and bus structures, such as a parallel port, game port, an IEEE 1394 Port (also known as a Firewire port), a serial port, or a universal serial bus (USB).

In yet another aspect, the display device 411 can also be connected to the system bus 413 via an interface, such as the display adapter 409. It is contemplated that the computer 401 can have more than one display adapter 409 and the computer 401 can have more than one display device 411. For example, the display device 411 can be a monitor, an LCD (Liquid Crystal Display), or a projector. In addition to the display device 411, other output peripheral devices can comprise components such as speakers (not shown) and a printer (not shown) which can be connected to the computer 401 via the Input/Output Interface 410. Any step and/or result of the methods can be output in any form to an output device, Such output can be any form of visual representation, including, but not limited to, textual, graphical, animation, audio, tactile, and the like. The display device 411 and computer 401 can be part of one device, or separate devices.

The computer 401 can operate in a networked environment using logical connections to one or more remote computing devices 414a,b,c. By way of example, a remote computing device can be a personal computer, portable computer, smartphone, a server, a router, a network computer, a peer device or other common network node, and so on. Logical connections between the computer 401 and a remote computing device 414a,b,c can be made via a network 415, such as a local area network (LAN) and/or a general wide area network (WAN). Such network connections can be through the network adapter 408. The network adapter 408 can be implemented in both wired and wireless environments. Such networking environments are conventional and commonplace in dwellings, offices, enterprise-wide computer networks, intranets, and the Internet, For purposes of illustration, application programs and other executable program components such as the operating system 405 are illustrated herein as discrete blocks, although it is recognized that such programs and components reside at various times in different storage components of the computing device 401, and are executed by the one or more processors 403 of the computer. An implementation of the product navigation software 406 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed, by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   determining, by a user device, based on user preference data associated with a user of the user device, merchant data comprising information corresponding to one or more merchants of a plurality of merchants, wherein the merchant data further comprises information corresponding to a plurality of stores associated with each merchant of the one or more merchants, wherein the user preference data comprises at least a minimum price threshold, a maximum price threshold, a minimum distance threshold, a maximum distance threshold, one or more preferred merchants, and one or more preferred stores;
   receiving, by a computing device, from the user device, the merchant data and a query comprising one or more text strings corresponding to a desired product description and a unique product identifier, wherein the unique product identifier comprises one or more of a stock keeping unit (SKU) or a universal product code (UPC);

determining, based on the merchant data, one or more databases of inventory data of the plurality of stores associated with each merchant of the one or more merchants and one or more cryptographic keys associated with at least one merchant of the one or more merchants for facilitating access to the one or more databases;

sending, by the computing device via an application interface (API) call, to the one or more databases, the one or more cryptographic keys;

receiving, by the computing device via the API call, from the one or more databases, based on the one or more cryptographic keys, access to the inventory data of the plurality of stores;

determining, based on the query and based on accessing the inventory data, at least two products associated with the desired product description, wherein the at least two products correspond to at least two database entries of a plurality of database entries of the one or more databases;

receiving a user selection of one product of the at least two products;

determining, for the one product, product location information, wherein the product location information comprises a location of the one product in at least two stores of the plurality of stores associated with each merchant of the one or more merchants, wherein the at least two stores of the plurality of stores are determined based on a distance between a location of the user device and the at least two stores being within the maximum distance threshold;

receiving a user selection of one store of the at least two stores;

determining, based on the user selection of the one store, directions from a location of the user device to a location of the one store;

receiving, based on the user selection of the one store, an additional query comprising an additional product associated with the user preference data;

determining, based on the additional query, additional product location information, wherein the additional product location information comprises a location of the additional product in the one store;

sending the product location information, the additional product location information, and the directions to the user device;

causing, by the user device, a user interface to display the directions;

causing, by the user device, based on the user device coming within a predefined geofence relative to the one store, the user interface to transition from displaying the directions to displaying the product location information and the additional product location information as an overlay on an map of the store, wherein the product location information and the additional product location information each further comprise a section identifier, a row identifier, an isle identifier, and a shelf identifier; and causing, by the user device, based on a user input, the user interface to display a three-dimensional representation of the product location information and the additional product location information.

2. The method of claim 1, further comprising receiving a selection of the one store from the user device.

3. The method of claim 1, wherein determining, based on the query and based on accessing the inventory data, the at least two products associated with the desired product description comprises determining at least one inventory associated with the inventory data comprising the at least two products associated with the desired product description.

4. The method of claim 1, wherein the at least two stores of the plurality of stores are determined based on a travel time of each store of the at least two stores relative to the user device.

5. The method of claim 1, wherein the at least two products correspond to at least two relational database entries of a plurality of relational database entries.

6. The method of claim 5, wherein each relational database entry of the plurality of relational database entries comprises a respective at least one product location information.

7. The method of claim 6, wherein the respective at least one product location information facilitates a display, by the user device, of the at least one product via a user interface.

8. An apparatus, comprising:
one or more processors; and
a memory comprising processor executable instructions that, when executed by the one or more processors, cause the apparatus to:
determine, by a user device, based on user preference data associated with a user of the user device, merchant data comprising information corresponding to one or more merchants of a plurality of merchants, wherein the merchant data further comprises information corresponding to a plurality of stores associated with each merchant of the one or more merchants, wherein the user preference data comprises at least a minimum price threshold, a maximum price threshold, a minimum distance threshold, a maximum distance threshold, one or more preferred merchants, and one or more preferred stores;
receive, from the user device, the merchant data and a query comprising one or more text strings corresponding to a desired product description and a unique product identifier, wherein the unique product identifier comprises one or more of a stock keeping unit (SKU) or a universal product code (UPC);
determine, based on the merchant data, one or more databases of inventory data of the plurality of stores associated with each merchant of the one or more merchants and one or more cryptographic keys associated with at least one merchant of the one or more merchants for facilitating access to the one or more databases;
send, via an application interface (API) call, to the one or more databases, the one or more cryptographic keys;
receive, via the API call, from the one or more databases, based on the one or more cryptographic keys, access to the inventory data of the plurality of stores;
determine, based on the query and based on accessing the inventory data, at least two products associated with the desired product description, wherein the at least two product correspond to at least two database entries of a plurality of database entries of the one or more databases;

receive a user selection of one product of the at least two products;

determine, for the one product, product location information, wherein the product location information comprises a location of the one product in at least two stores of the plurality of stores associated with each merchant of the one or more merchants, wherein the at least two stores of the plurality of stores are determined based on a distance between a location of the user device and the at least two stores being within the maximum distance threshold;

receive a user selection of one store of the at least two stores;

determine, based on the user selection of the one store, directions from a location of the user device to a location of the one store;

receive, based on the user selection of the one store, an additional query comprising an additional product associated with the user preference data;

determine, based on the additional query, additional product location information, wherein the additional product location information comprises a location of the additional product in the one store;

send the product location information, the additional product location information, and the directions to the user device;

cause, by the user device, a user interface to display the directions;

cause, by the user device, based on the user device coming within a predefined geofence relative to the one store, the user interface to transition from displaying the direction to displaying the product location information and the additional product location information as an overlay on a map of the store, wherein the product location information and the additional product location information each comprise a section identifier, a row identifier, an isle identifier, and a shelf identifier; and cause, by the user device, based on a user input, the user interface to display a three-dimensional representation of the product location information and the additional product location information.

9. The apparatus of claim 8, wherein the processor executable instructions that, when executed by the one or more processors, further cause the apparatus to receive a selection of the one store from the user device.

10. The apparatus of claim 8, wherein the processor executable instructions that, when executed by the one or more processors, further cause the apparatus to determine, based on the query and based on accessing the inventory data, the at least two products associated with the desired product description by determining at least one inventory associated with the inventory data comprising the at least two products associated with the desired product description.

11. The apparatus of claim 8, wherein the processor executable instructions that, when executed by the one or more processors, cause the apparatus to determine the at least two stores of the plurality of stores further cause the apparatus to determine the at least two stores within a travel time relative to the user device.

12. The apparatus of claim 8, wherein the at least two products correspond to at least two relational database entries of a plurality of relational database entries.

13. The apparatus of claim 12, wherein each relational database entry of the plurality of relational database entries comprises a respective at least one product location information.

14. The apparatus of claim 13, wherein the respective at least one product location information facilitates, a display, by the user device, of the at least one product via a user interface.

* * * * *